3,445,326
PRIMER FOR FLEXIBLE NON-POROUS SURFACES
Alan R. Hurst, Hinsdale, Ill., assignor, by mesne assignments, to Morton Salt Company, Chicago, Ill., a corporation of Delaware
No Drawing. Filed Jan. 31, 1964, Ser. No. 341,764
Int. Cl. B32b 15/04, 13/12, 13/06
U.S. Cl. 161—207                                           16 Claims

ABSTRACT OF THE DISCLOSURE

An aluminum foil or other thin, flexible, non-porous structure is coated with a thin layer of primer which is a saturated amino-substituted silane such as gamma-aminopropyltriethoxysilane, and the primer is dried. A thin film of non-porous coating material, such as polypropylene or polyethylene film or polyvinylchloride-wax slip-coat, is applied over the dry layer of primer to provide a flexible laminate structure. The silane alone provides high strength adhesion between the surfaces.

---

This invention relates to primers for non-porous surfaces of foils, films and the like, for rendering such surfaces receptive to other materials and especially for rendering such non-porous surfaces joinable to other non-porous surfaces. The invention further relates to compositions applied as primers to such non-porous surfaces and dried in the preparation of the surface for receiving a subsequent coating such as an extrusion or solution or adhesion coating, e.g. a slip-coat for permitting removal of the non-porous surface from a mandrel.

Recently, in the container industry, much interest has been directed to the development of foil- or film-lined containers such as those having outer laminated layers of foil, film, paper, etc. Such containers, usually having cylindrical walls, can be manufactured by winding and bonding a plurality of layers, e.g. one following another and overlapping at the edges, on a mandrel and thereafter removing the wound laminate structure from the mandrel. However, problems have occurred in bonding the non-porous surfaces of foils and films in a laminate structure. Adhesive materials must be applied between the layers and the innermost layer of the structure has a non-porous inner surface which must be slip-coated if the structure is to be easily removed from the mandrel, but adhesion to the non-porous surfaces is difficult to attain, especially when applying thereto a layer which also has a non-porous surface.

A general object of this invention is to provide for adhesion of non-porous surfaces as herein described.

An object of this invention is to improve the ability of a non-porous surface of a flexible member such as film or foil to receive an adhering coating layer such as an extrusion coat, a solution coat, an adhesive coat with film or foil applied thereover, adhesive coated film or foil, etc.

Another object of this invention is to provide a new and useful flexible laminate structure including a film or foil as a substrate and a coating or film of a particular primer composition forming a dry primer coating on the substrate surface.

Still another object is to provide such a flexible laminate structure in which an additional layer of flexible material, preferably a non-porous film or foil, is applied over the prepared or primed surface, e.g. as an adhesive bonded layer, an extrusion bonded layer, a solution coating, etc.

Still another object is to provide a new and useful flexible structure having a slip-coated surface and capable of being wound on a mandrel and thereafter readily removable from the mandrel.

Adhesives, even of high strength, have been known for bonding metal-to-metal. The metal surface is often primed prior to application of the adhesive. Suitable adhesives include those of the phenolic resin type, for example. However, corrosion at the metal bond, resulting in weakening of the bond, has caused the addition of silylamines to the adhesive for corrosion inhibition, such as described by Gross in U.S. Patent 3,066,060, granted Nov. 27, 1962. Also, silanes of the hydrolyzed and halogenated type have been mentioned per se as adhesives by Hager et al., in U.S. Patent 2,853,412, granted Sept. 23, 1958, and are applied as a contact-type adhesive material on the surface to be bonded.

It is also known that certain other silanes may be used in adhesives in joining a non-porous surface of a generally non-flexible object to another non-porous surface; for example, Jenkins et al., in U.S. Patent 3,022,196, granted Feb. 20, 1962 bond silicone rubber to a metal substrate using an adhesive including an unsaturated silane. The material of Jenkins et al. may also be applied to a metal surface and dried as a protective coating rather than used as an adhesive. Cured silanes as corrosion resisting protective coating for metals are also mentioned in Morehouse et al. U.S. Patent 3,085,908, granted Apr. 16, 1963.

The silanes when used as cured protective coatings are apparently not good adhesive materials. On the other hand, the uncured or undried materials in a tacky form and of a particular structural composition are acceptable adhesive materials. It has now been found that certain of the dried or cured silane materials may be used for improving the receptability of a non-porous surface of a flexible material for application of other coatings thereover and that this improvement may be attained without destroying the flexibility of the flexible material.

Therefore, in one form of this invention it is a more particular object of this invention to provide a dry, thin amino-functional silane coating or film, on a non-porous and non-fibrous surface of a flexible metal foil or polyolefin film, as a primer in an amount rendering the surface more receptive to adherence of other non-porous flexible coating materials or layers thereto, as well as to provide a laminate structure including such dry silane as an intermediate layer.

Other objects of this invention will be apparent to those in the art from the description given herein.

While this invention is susceptible of embodiment in many different forms, there is described herein in detail a specific embodiment of the invention, with the understanding that the present disclosure is to be considered as an exemplification of the principles of the invention and is not intended to limit the invention to the embodiment or modification described.

The amino-functional silanes used in the present invention have at least one free amino group attached to the silicon atom through a saturated hydrocarbon bridge or link and are applied to the non-porous surface and dried in situ to a solid film or coating state. In the solid state, they are generally non-tacky and non-adhesive in themselves although they improve the receptability of the surface to which they have been applied for receiving other applied coatings. Exemplary of the amino-functional silanes are those of the formula $NH_2RSi(OR')_3$ in which R is a bridge between the silicon and nitrogen atoms and is selected from the class consisting of lower aliphatic hydrocarbon, e.g. $C_1$ to $C_6$, hydroxy lower aliphatic hydrocarbon and amino lower aliphatic hydrocarbon and wherein R' is lower alkyl, e.g. $C_1$ through $C_4$. Such amino-substituted silanes are, in their undried state, in the liquid viscosity range, including the very viscous liquids. A preferred specific amino-functional or amino-substituted silane is gamma-aminopropyltriethoxysilane. The amino-substituted silanes useful herein are preferably saturated and include at least one free amino group.

In preparing a laminate structure in accordance herewith, the silane material is applied as a primer coating to the non-porous surface. During application, the silane may be in solution or in solvent-free state and can be applied to the surface by any practical means such as, for example, spraying, roller coating, brushing, dipping, extruding directly to the surface, etc., of the substrate. The flexible substrate, having a non-porous surface and preferably a non-fibrous surface, may be in foil or film form, such as the metal foils including aluminum and tin foils, the flexible plastic films including especially the polyolefin films, or the like. Other films which may find application in accordance herewith as non-porous substrates are Mylar, saran-coated cellophane, nitrocellulose-coated cellophane, cellophane, etc.

After application of the primer to the substrate, the primer is dried or cured. Such drying or curing may be at room temperature or at elevated temperature. However, the elevated temperature should not exceed a temperature at which the substrate is adversely affected for its intended purpose, e.g. by buckling or deteriorating. For high initial bond of additional coatings to the primed surface, it is preferred that the cure or drying be conducted at as high a temperature as is practical below the substrate buckling or deterioration temperature. Such high temperature cure results in immediate or fast drying, adapting the primer for use in in-line priming, i.e. for priming and thereafter drying the web of foil or film as it is being fed to in-line equipment for joining the primed foil or film to another foil or film, or to the equipment for applying a solution coating or the like to the primed foil or film surface. It has been found that for aluminum foil a temperature of about 300° F. gives a fast cure while preventing buckling. A slightly lower temperature is preferred for such polyolefin films as polyethylene and polystyrene, e.g. on the order of about 200° to 300° F.

In applying the primer from solution, any of many organic solvents, including the hydrocarbon solvents, may conveniently be used. Additionally, soluble hydrolysates of the silane may be used in aqueous solution or the silane may be dispersed in water for application.

The primer is applied in a thickness sufficient to improve the acceptability of the primed surface for additional coating materials. As an exemplary range, the primer may be applied in a thickness as low as .00001 dry pound per 3,000 sq. ft. or even lower, or as high as .05 dry pound per 3,000 sq. ft. or higher. There appears to be no advantage in the priming ability achieved by using coating thicknesses greater than .05 pound per 3,000 sq. ft., i.e. thicknesses into the thicker protective coating ranges. The primer not only improves the acceptability of the surface to adhesives and the like but also improves the heat sealability of the surface. The primer improves surface reception for almost any coating material subsequently applied, whether through adhesion or extrusion or other bond.

The coated foil or film, after drying may be stored until needed, if desired, e.g. in roll form. Where it is desired, to apply coating layer to the laminate of foil or film and primer, the coating layer may be applied in any manner desired, e.g. by extrusion, from solution, as a coating resin or composition in drying oils, etc. Such additional coating materials may be applied for such purposes as decreasing the flexibility or for increasing the rigidity of the flexible substrate, protecting the substrate layer against corrosive, oxidative or other deterioration, for providing a tough protective layer for protection against physical damage, for improving the appearance of the substrate primer laminate, or for other desired purposes.

A porous material, such as adhesive-coated paper, may be used as a layer applied to the primed substrate. It is also an advantage of the present primed surfaces that such non-porous materials as the above described foils or films, constituting the substrate, may also be applied over the primed substrate as an additional layer in a laminate structure. Thus, the primed substrate is useful in forming laminates having a multiplicity of layers and can be additionally built up as desired. Any of two adjacent layers in the laminate article may comprise the non-porous substrate with the primer applied thereto.

It will be noted that polyethylene coated foil products, foil coated foil products, polypropylene coated polyethylene products, aluminum foil coated polypropylene products, etc. may be prepared in accordance herewith. In a particularly advantageous application of the primed substrate there may be applied to the primed surface thereof a slip-coat so that the primed substrate may be used as an innermost layer of a wound laminate tube with the slip-coated primed surface applied against a mandrel, faced inward as the first layer of winding on the mandrel in producing a wound laminate tube. Other wound layers may be applied thereover using suitable adhesives, heat seals, or the like.

The inner slip-coat permits ready withdrawal of the mandrel or removal of the wound tube from the mandrel. The slip-coat may be, for example, a solution of a mixture of plastic and wax of the type normally used as a slip-coat in methylethylketone or toluene or other suitable solvent. More specifically, the slip-coat may be 15 parts by weight wax per 100 parts by weight polyvinylchloride, nitrocellulose, polyamide, or the like in methylethylketone solution. Preferably, such slip-coat is applied to the primed substrate surface in a coat weight of about .25 to 3 dry pounds per 3,000 sq. ft.

Further, the outer surface of the primed substrate for use in forming the innermost layer of a wound laminate may also be primed, e.g. prior to winding, and dried for better adherence of adhesives or for heat-sealing subsequent layers directly thereto.

As examples of preparation of laminates in accordance herewith, the following are offered by way of illustration.

Example I

Aluminum foil was coated with approximately .001 dry pound per 3,000 sq. ft. of gamma-aminopropyltriethoxysilane. The foil was then subjected to a temperature of approximately 300° F. until the primer was dry. A flexible thin polyethylene film was then heat-sealed directly to the primed surface. The resulting laminate structure had a bond strength between the aluminum foil and polyethylene film, capable of resisting a pull of 1,000 pounds per square inch.

Example II

The procedure of Example I was repeated substituting polypropylene film for the polyethylene film and the bond strength results were similar.

Example III

The procedure of Example I was repeated substituting a polyethylene film for the aluminum foil and a polypropylene film for the polyethylene film. The primed polyethylene film was dried at room temperature rather than the elevated temperature. The resulting structure gave similar results with respect to bond strength.

Example IV

In addition to the above, a composition marketed by Dow Corning Corporation under the designation Z–6020, was substituted for the gamma-aminopropyltriethoxysilane of the above examples and the examples were tested with similar bond strength results. The composition Z–6020 is believed to have the structure $Z_nR''Si(OR''')_3$ wherein $R''$ is a $C_1$ or $C_{3+}$ aliphatic hydrocarbon with a valence of $n+1$ and $n$ is a positive integer, $R'''$ is $C_1$ to $C_4$ alkyl and Z is a monovalent group containing at least two free amine groups.

Example V

A long strip of aluminum foil is coated with .0001 pound per 3,000 sq. ft. of gamma-aminopropyltriethoxy-silane from toluene solution. The resulting coated surface is permitted to dry at room temperature. A mixture of 20 parts polyvinylchloride and 3 parts wax in 77 parts methylethylketone solvent is applied to the dried primed surface in an amount sufficient to give about 1 dry pound per 3,000 sq. ft. coat weight. The aluminum foil is then faced against a cylindrically-shaped mandrel and spiral-wound to tubular configuration. Additional layers of paper, polyethylene film, and the like are applied thereon in the spiral-winding with adhesive between the layers as needed. The resulting structure is readily slidable from the mandrel in an axial direction during winding of the tube.

I claim:
1. As an article of manufacture, a flexible sheet structure comprising a non-porous flexible plastic film or metal foil substrate having a non-fibrous surface and a dry thin primer film of non-hydrolyzed saturated amino substituted silane adhering to the surface of said substrate in an amount sufficient to improve the adherability of non-porous film coating materials to said surface.
2. The structure of claim 1 wherein said non-porous substrate is selected from the class consisting of metal foil and polyolefin film.
3. The structure of claim 2 wherein said substrate is aluminum foil.
4. The structure of claim 2 wherein said substrate is polyethylene film.
5. The structure of claim 2 wherein said substrate is polypropylene film.
6. A laminate structure according to claim 1 wherein said amino-substituted silane is of the formula:

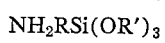

wherein R is a bridge between the silicon and nitrogen atoms and is selected from the class consisting of lower aliphatic hydrocarbon, hydroxy lower aliphatic hydrocarbon and amino lower aliphatic hydrocarbon and R' is lower alkyl and wherein said amino-substituted silane in its undried state is in the liquid range.
7. The laminate structure of claim 6 wherein said amino-substituted silane is γ-aminopropyltriethoxysilane.
8. A flexible laminate structure comprising a non-fibrous thin flexible plastic film or metal foil substrate, a layer consisting essentially of dry non-hydrolyzed saturated amino-substituted silane adhering to a surface of said substrate, said amino-substituted silane including at least one free amino group per molecule, and a film of non-porous coating material in adherence with said layer of said silane.
9. The laminate of claim 8 wherein said coating material is an extruded coating.
10. The laminate of claim 8 wherein said coating material is a solution coat.
11. The laminate structure of claim 8 wherein said coating material is a mandrel slip-coat.
12. A flexible laminate structure comprising a non-fibrous plastic film or metal foil substrate and a layer consisting essentially of dry non-hydrolyzed saturated amino-substituted silane adhering to a surface of said substrate and of a thickness corresponding to from about .00001 to about .05 pound per 3,000 square feet of surface of said substrate.
13. A flexible laminate structure comprising a first layer of metal foil, a second layer consisting of dry non-hydrolyzed aminopropyltriethoxy-silane in surface-to-surface adherence with said layer of metal foil, and a non-porous film of coating material applied to and in adherence with the surface of said second layer.
14. The laminate structure of claim 13 wherein said coating material comprises a mixture of plastic and wax.
15. The laminate structure of claim 13 wherein said coating material is a polyethylene film.
16. The laminate structure of claim 13 wherein said coating material is a polypropylene film.

References Cited

UNITED STATES PATENTS

| | | | |
|---|---|---|---|
| 3,318,757 | 5/1967 | Atwell | 156—329 X |
| 3,321,350 | 5/1967 | Fekete | 156—329 |
| 3,022,196 | 2/1962 | Jenkins et al. | 156—329 X |
| 3,046,155 | 7/1962 | Reinke | 156—329 X |
| 3,158,519 | 11/1964 | Shannon et al. | 156—180 |
| 3,200,031 | 8/1965 | Rittenhouse | 161—206 |

EARL M. BERGERT, *Primary Examiner.*

T. R. SAVOIE, *Assistant Examiner.*

U.S. Cl. X.R.

161—208; 156—329, 244; 117—135.1, 161